(12) United States Patent
Fischer

(10) Patent No.: US 7,172,241 B2
(45) Date of Patent: Feb. 6, 2007

(54) DASHBOARD SUPPORT WITH VIBRATION-DAMPING FEATURE

(75) Inventor: Jochem Fischer, Ostfildern (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 53 days.

(21) Appl. No.: 11/136,054

(22) Filed: May 24, 2005

(65) Prior Publication Data

US 2005/0279909 A1   Dec. 22, 2005

(30) Foreign Application Priority Data

Jun. 18, 2004   (DE) ..................... 10 2004 029 592

(51) Int. Cl.
  *B62D 25/14* (2006.01)
  *B62D 37/06* (2006.01)
(52) U.S. Cl. ................. 296/193.02; 296/1.03
(58) Field of Classification Search ........... 296/193.02, 296/1.03, 72
  See application file for complete search history.

(56) References Cited

U.S. PATENT DOCUMENTS

| 3,220,268 A | * | 11/1965 | Brandt, Jr. ..................... 74/87 |
| 5,012,174 A | * | 4/1991 | Adkins et al. ............... 318/649 |
| 6,572,178 B2 | * | 6/2003 | Hartel et al. ........... 296/190.08 |

FOREIGN PATENT DOCUMENTS

| DE | 39 39 822 A1 | 6/1991 |
| DE | 197 25 919 C2 | 2/1999 |
| DE | 101 12 738 C1 | 6/2002 |

* cited by examiner

*Primary Examiner*—Dennis H. Pedder
*Assistant Examiner*—Michael Hernandez
(74) *Attorney, Agent, or Firm*—Henry M. Feiereisen

(57) ABSTRACT

A dashboard support for a motor vehicle includes a support beam extending between A pillars of a vehicle body. Interacting with the support beam is an active arrangement for implementing a vibration damping. The active arrangement includes a gyroscopic oscillator unit which is arranged in an attachment zone of the steering column to the support beam and has an electric motor provided with at least one eccentric mass and constructed for spatial positioning within the gyroscopic oscillator.

5 Claims, 2 Drawing Sheets

DASHBOARD SUPPORT WITH VIBRATION-DAMPING FEATURE

CROSS-REFERENCES TO RELATED APPLICATIONS

This application claims the priority of German Patent Application, Serial No. 10 2004 029 592.1, filed Jun. 18, 2004, pursuant to 35 U.S.C. 119(a)–(d), the subject matter of which is incorporated herein by reference.

BACKGROUND OF THE INVENTION

The present invention relates, in general, to a dashboard for a motor vehicle, and more particularly to a dashboard support placed transversely between the A pillars of the vehicle body.

Nothing in the following discussion of the state of the art is to be construed as an admission of prior art.

A dashboard support includes typically a support beam, e.g. a tube which is placed between the A pillars and includes various mountings for retaining the instrument panel as well as further vehicle components, such as vehicle heating, ventilating and air conditioning system, airbag, steering column, center console, fuse box or glove compartment. The dashboard support is intended to satisfy several functions. Apart from reinforcing the vehicle body, the dashboard support should be able to absorb energy in the event of a collision, to connect various spatial points and allow attachment of various mountings. In addition, the dashboard support should be suitable for operation in different frequency ranges because various vibrations, caused by the chassis or engine for example, are experienced during travel. These vibrations can be compensated by an active arrangement as described, e.g., in German Pat. No. DE 101 12 738 C1, whereby the active arrangement includes piezo elements in an attachment zone between the A pillars and the support beam as well as in an attachment zone of the steering column to the support beam. When the dashboard support is caused to vibrate during travel, sensors detect the vibration which is then damped by an actively generated compensating vibration.

German patent publication no. DE 39 39 822 A1 discloses a vibration damping system for a motor vehicle, having a control unit for detecting interfering vibrations and for controlling an adjuster for operating a vehicle-mounted oscillator in response to the detection of interfering vibrations. The oscillator introduces into the motor vehicle superimposing and damping, phase-shifted counter vibrations in opposition to the interfering vibrations. The oscillator is formed by a functional element of the vehicle, e.g. battery or radiator, and the adjuster is realized in the form of a piezoceramic actuator.

German Pat. No. DE 197 25 919 C2 discloses a bearing element for a vibrating machine, especially an internal combustion engine. The bearing element is secured to a vehicle body and includes an integrated shaft with revolving compensating mass and own drive. Dynamic forces, caused by inertia of accelerated masses of the internal combustion engine, are compensated by the bearing element.

It would be desirable and advantageous to provide an improved dashboard support which is constructed with a vibration damping feature to realize an effective and precise compensation of interfering vibrations.

SUMMARY OF THE INVENTION

According to one aspect of the present invention, a dashboard support for a motor vehicle includes a support beam extending between A pillars of a vehicle body, and an active arrangement, interacting with the support beam, for implementing a vibration damping, wherein the active arrangement includes a gyroscopic oscillator unit having an electric motor provided with at least one eccentric mass and constructed for movement on a movement path.

The present invention resolves prior art problems by the arrangement of a gyroscopic oscillator unit which generates a compensating vibration to oppose the interfering vibration caused during travel of the motor vehicle. Especially advantageous is the capability to provide hereby a spatial vibration control.

According to another feature of the present invention, a sensor is provided to detect any vibration caused during travel, for example as a result of vibration introduced from the roadway via the tires or from the engine. The sensor generates in response to the detected vibration signals which are sent to a control and regulating unit which is operatively connected to the gyroscopic oscillator. In response to the detected vibration, the gyroscopic oscillator unit is operated to produce an opposing or compensating vibration to thereby damp the interfering vibration by either neutralizing it or shifting it to a frequency range that has no adverse effect or is not perceived.

In view of the fact that a major part of the vibration caused during travel is introduced through the steering column, damping action can be made more effective by arranging the gyroscopic oscillator unit in an attachment zone of a steering column to the support beam. As a consequence, the vibration compensation is realized in immediate proximity of the origin of vibration or introduction of vibration. In this way, vibration damping can be realized efficiently and with little expenditure of energy.

According to another feature of the present invention, the electric motor may be constructed for operating at high revolution and installed on the movement path which can be spatially moved by means of a servo drive. The electric motor can thus be spatially displaced on the gyroscopic oscillator unit so that different spatial regions can be reached. The electric motor with the eccentric mass is positioned to match the introduced vehicle vibration and the generated counter vibration.

Suitably, the electric motor with the eccentric mass is positioned spatially inside the gyroscopic oscillator unit at a location where the counter vibration is most effective. In this way, the gyroscopic oscillator unit is effective in at least two spatial planes.

The use of a gyroscopic oscillator unit according to the invention enables the realization of a very broad spectrum of opposing or compensating vibrations. Thus, unwanted vibration can be compensated even quicker. In particular, when heavy vehicles are involved, an active vibration damping according to the invention can be effectively implemented. If need be, hazardous vehicle conditions can be detected by sensors, and the gyroscopic oscillator unit can then be used to produce a targeted atypical vibration of the dashboard support to indicate to the operator the presence of a potential danger situation.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
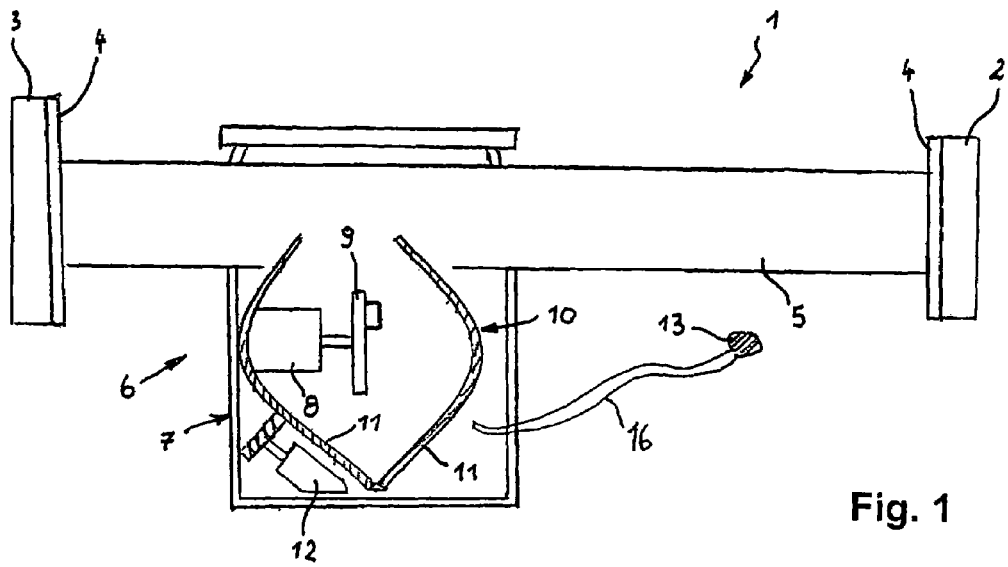
FIG. 1 is a simplified, schematic illustration of a dashboard support according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified, schematic illustration of a dashboard support according to the present invention, generally designated by reference numeral 1 and extending between A pillars 2, 3, indicated only schematically, of an automotive vehicle body in a direction transversely to the traveling direction of the vehicle body. The connection of the dashboard support 1 to the A pillars 2, 3 is realized via terminal mountings 4. The dashboard support 1 includes a support beam 5 for carrying the dashboard or instrument panel (not shown) and intended for attachment and securement of various vehicle components such as vehicle heater, ventilating and air conditioning system, airbag, steering column, center console, fuse box or glove compartment.

Associated to the support beam 5 is an active arrangement for vibration damping. In accordance with a presently preferred embodiment, the active arrangement includes a gyroscopic oscillator, generally designated by reference numeral 7 and mounted in an attachment zone 6 of the unillustrated steering column to the support beam 5. The gyroscopic oscillator unit 7 includes an electric motor 8 which drives an eccentric mass 9. The electric motor 8 is installed on a movement path or track 11 in a gyro 10. The gyro 10 and the track 11 are movably supported by a gyroscope drive 12 so as to allow adjustment of their position. A movement of the gyro 10 and track 11 results in a spatial repositioning of the electric motor 8 with the mass 9 inside the gyroscopic oscillator unit 7.

Figure 2:
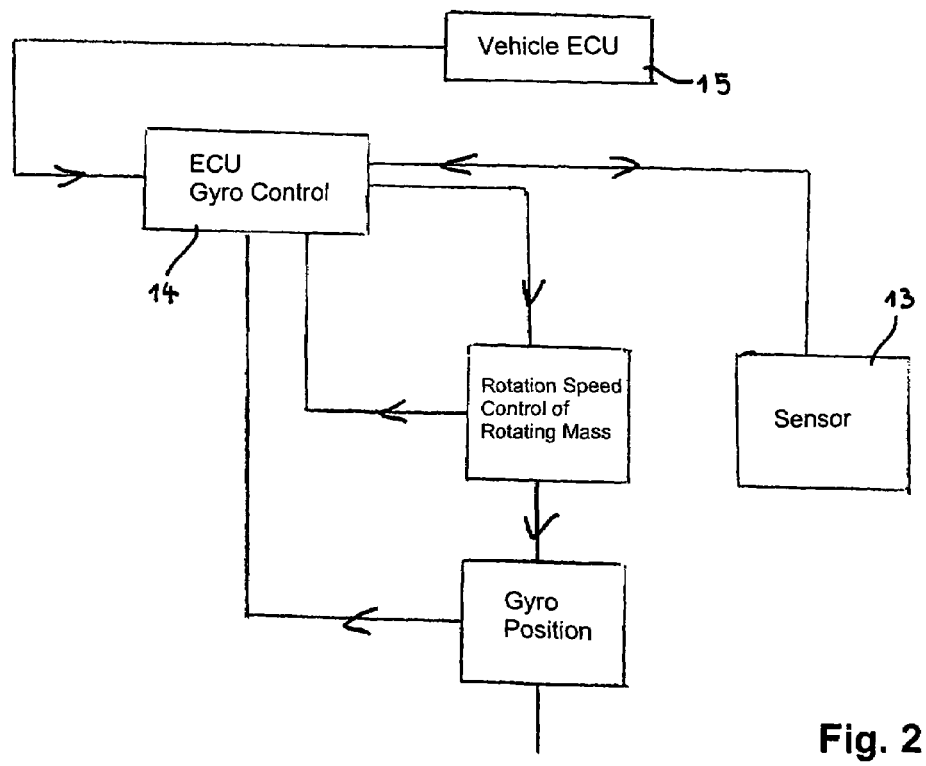
FIG. 2 is a simplified block diagram of a control system for realizing a vibration damping.
Figure 3:
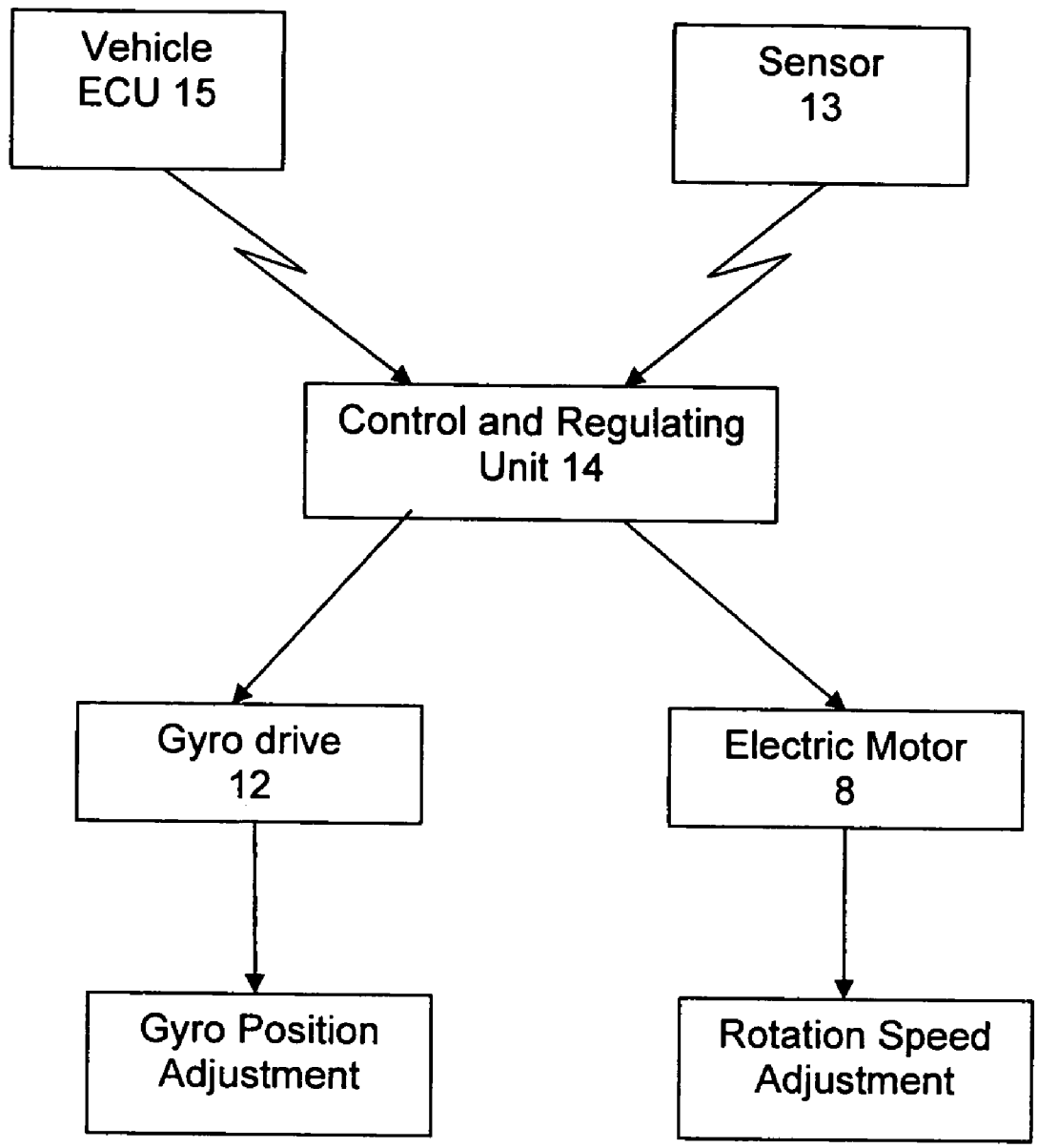
FIG. 3 is a block diagram of an overall active arrangement for vibration damping.

The active arrangement for vibration damping further includes vibration sensors 13, of which one is shown by way of example only in FIG. 1 and operatively connected by lines 16 to the gyroscopic oscillator unit 7. During travel of the vehicle, the sensors 13 detect vehicle vibrations caused by the roadway, tires, or engine and the like. In response to detected data, the sensors 13 generate respective signals which are transmitted to a control and regulating unit 14 for subsequent evaluation, as shown in FIG. 2. The analysis and evaluation is executed under consideration of additional data inputted in the control and regulating unit 14 from an electronic control unit (ECU) of the motor vehicle 15. In response to the ascertained vibrations, the control and regulating unit 14 determines a counter vibration and transmits commensurate signals to the gyroscopic oscillator unit 7. As shown in particular in FIG. 3, frequency and amplitude of the counter vibration is adjusted by changing the rotation speed of the electric motor 8 and the mass 9 and by adjusting the position of the eccentric mass 9 within the gyroscopic oscillator unit 7 by means of the gyroscope drive 12. By shifting the position of the mass 9 within the gyroscopic oscillator unit 7, a spatial vibration control can be realized at least in two spatial planes. A control of the rotation speed of the electric motor 8 and the rotation of the mass 9 results in a precise adaptation to the operating conditions of the vehicle at hand. The vehicle vibration is superimposed by a targeted counter vibration.

Thus, an effective damping action of unwanted vehicle vibration is realized, and interfering vibration is suppressed or at least shifted to a frequency range that has no adverse impact and is not perceived by a vehicle occupant during travel.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A dashboard support for a motor vehicle, comprising:
   a support beam extending between A pillars of a vehicle body; and
   an active arrangement, interacting with the support beam, for implementing a vibration damping, said active arrangement including a gyroscopic oscillator unit having an electric motor provided with at least one eccentric mass and constructed for movement on a movement path.

2. The dashboard support of claim 1, wherein the gyroscopic oscillator unit is arranged in an attachment zone of a steering column to the support beam.

3. The dashboard support of claim 1, further comprising a sensor for detecting vehicle vibrations, and a control and regulating unit, said gyroscopic oscillator unit being operatively connected to the sensor and the control and regulating unit.

4. The dashboard support of claim 1, wherein the gyroscopic oscillator unit is effective in at least two spatial planes.

5. The dashboard support of claim 1, wherein the gyroscopic oscillator unit has a gyro and a drive for moving the gyro along the movement path, said electric motor being mounted to the gyro.

* * * * *